Sept. 25, 1962 R. A. MAYNE 3,055,085
METHOD OF MAKING A BLOWER WHEEL
Filed Aug. 28, 1959
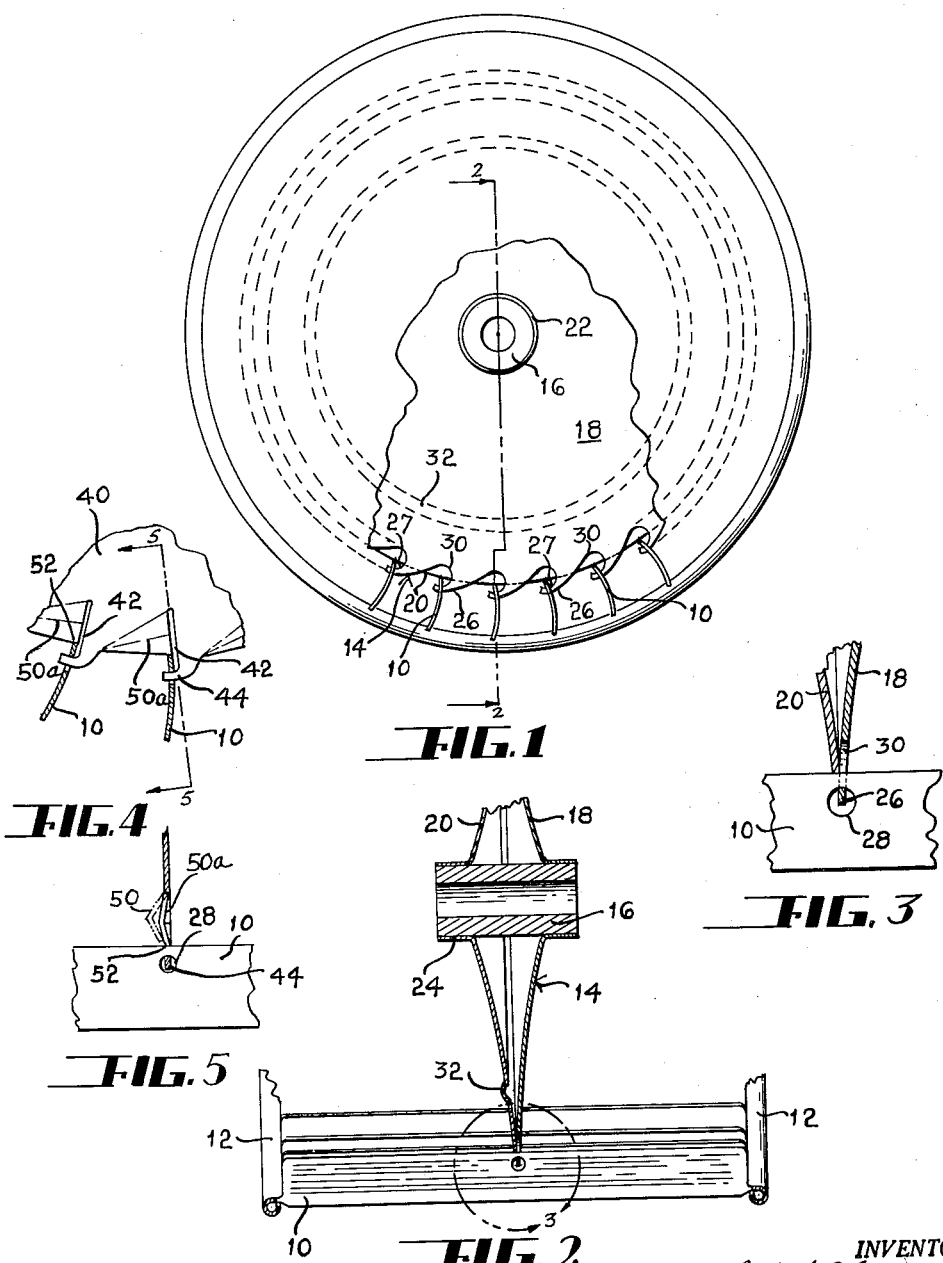
INVENTOR.
Robert A. Mayne
BY
HIS ATTORNEYS

United States Patent Office 3,055,085
Patented Sept. 25, 1962

3,055,085
METHOD OF MAKING A BLOWER WHEEL
Robert A. Mayne, Dayton, Ohio; Ruth D. Mayne,
executrix of said Robert A. Mayne, deceased
Filed Aug. 28, 1959, Ser. No. 836,767
7 Claims. (Cl. 29—156.8)

This invention relates to the method for assembling the center support in a blower wheel; however, the invention is not necessarily so limited.

The blower wheel to which this invention relates is of the type wherein a plurality of parallel elongate blade elements are supported in a cylindrical array. Ordinarily the cylindrical array of blades is mounted for rotation on a center support or spider. For effective operation, the center support must firmly engage the blades of the blower wheel such that rotational torque transmitted to the center support will be delivered to the blower wheel without slippage.

A simple and economical technique for establishing the requisite connection between the center support and the blower wheel is described in copending application, Serial No. 385,526, filed October 12, 1953, by Robert A. Mayne and Arthur F. Leis for a Blower Rotor and Method of Making Same. In this copending application techniques are described for expanding a center support disc radially outwardly to engage the blades of a blower wheel. Firm engagement between the center support disc and the blades results from a misfit between the center support disc and the blower wheel, such that the blades of the blower wheel are stressed outwardly and remain under tension. This type of construction gives fully acceptable performance in small sizes of blower wheels. In large sizes, however, centrifugal forces become significant such that the tension forces established by the misfit between the center disc and the blower wheel yield when the blower wheel is rotated permitting the center disc to slip in the blower wheel. This leads to faulty operation of the blower wheel.

An object of this invention is to provide a new and improved method for assembling a center support within a blower wheel.

Other objects and advantages reside in the method of manufacture and the mode of operation, as will become more apparent from the following description.

In the drawing, FIGURE 1 is a fragmentary plan view of the blower wheel of this invention.

FIGURE 2 is a fragmentary sectional view taken substantially along the line 2—2 of FIGURE 1.

FIGURE 3 is an enlarged detail view of the area bounded by the arcuate line 3 in FIGURE 2.

FIGURE 4 discloses a fragmentary view of a modification.

FIGURE 5 is a fragmentary cross sectional view, taken substantially on the line 5—5 of FIGURE 4.

Referring to the drawing in detail, FIGURE 1 illustrates a blower wheel comprising a plurality of inwardly projecting arcuate blades or louvers 10 supported in spaced parallel positions in a cylindrical array between beaded end ribs 12. As one example, this blower wheel may be constructed from interleaved stamped sheet metal blade sections in the manner disclosed in my copending application, Serial No. 543,867, filed October 31, 1955, now U.S. Patent 2,982,468, issued May 2, 1961, for a Blower Wheel and Method of Making Same.

The blower wheel is mounted upon a center support or spider 14 which comprises parallel oppositely dished discs 18 and 20 mounted upon a central hub 16. The discs 18 and 20 are provided with annular outwardly projecting flange portions 22 and 24, respectively, which telescope over the hub 16 and are welded or otherwise fixedly secured to the hub 16. The discs 18 and 20 are so located on the hub 16 that their outer peripheries are in abutment and preferably under slight contact pressure. With this construction, the discs 18 and 20 brace one another to provide a sturdy structure.

A plurality of arcuate hooks 26 are formed in the outer periphery of the disc 18. One hook 26 is formed for each blade 10 in the blower wheel. As best seen in FIGURE 3, each of the blades 10 is provided with a circular aperture 28 for receipt of a hook 26. To position the hooks 26 in the apertures 28, the center support 14 is slid axially into the blower wheel with the hooks 26 located midway between the blades 10. When the hooks 26 are aligned with the apertures 28, the center support 14 is rotated in the clockwise direction, as viewed in FIGURE 1, to project the hooks 26 into the apertures 28. Clearance for movement of the hooks 26 through the blades 10 is afforded by arcuate cut-away portions 30 formed in the disc 18 under the hooks 26. The innermost margins of the blades 10 project into these cut-away portions.

With the construction thus far described, the center support 14 may be loosely interlocked with the blades 10 of the blower wheel, but will easily separate therefrom upon application of a counterclockwise bias thereto. The disc 20 is utilized to take up this looseness and positively interlock the arcuate hooks 26 with the blades 10. The disc 20 has a circular outer periphery, the normal diameter of which is reduced through the formation of an annular arched protuberance 32 in the disc near its outer periphery. The diameter of the disc 20 after formation of the protuberance 32 is such that this disc will fit loosely in the blower wheel with its outer periphery just making contact with the innermost margins of the blades 10. After the center support 14 has been positioned in the blower wheel with the arcuate hooks 26 on the disc 18 projected into the apertures 28 in the blades 10, the protuberance 32 is pressed out of the disc 20. In this operation, the outer marginal portions of the discs 18 and 20 are pressed together, the protuberance 32 collapsing under the pressure applied.

Collapse of the protuberance 32 in the disc 20 necessarily results in an increase in the diameter of the disc 20. As the disc 20 increases in diameter the blades 10 are forced radially outwardly, bringing the innermost boundary of the apertures 28 into compressive engagement with the arcuate underside or bight 27 of the hooks 26. This action positively interlocks the blades 10 with the hooks 26. Thus, the bight in each hook is so formed that the end of the hook turns radially inwardly. When the disc 20 is expanded to force the blades 10 outwardly into the bight 27, the inwardly turned ends of the hooks 26 become effective to trap the blades 10 in the hooks 26.

After the protuberance 32 has been pressed out of the disc 20, the assembly of the center support within the blower wheel is complete. Thus, only two operations are required to positively interlock the center support with the blower wheel. First, the central support is slid axially into the blower wheel and rotated in a clockwise direction, as viewed in FIGURE 1, then the protuberance 32 is pressed out to complete the assembly. In regard to this assembly, it may be said that the disc 20 functions to maintain a normally snug contact between the center support and the blades 10, while the hooks 26 on the disc 18 function to secure the blades 10 against separation from the disc 20 under the strain of the centrifugal forces to which they are subjected.

In the modification disclosed in FIGURES 4 and 5, a single center disc 40 has been used that is provided with a radially disposed incision 42, the width of which has been greatly exaggerated for the purpose of clarity. The center disc is provided with a hook-shaped portion 44 entering an aperture 28 in the blade 10. The portion of the disc located on the side of the incision 42 opposite the hook-shaped portion is deflected into a V-shaped portion 50 into the shape shown in dot-dash lines in FIGURE 5. By straightening out this portion 50 into a substantially radial position, as illustrated by 50a, the outer margin 52 of the portion 50 abuts the inner margin of the blade 10, so as to clamp the portion of the blade located between the aperture 28 and the inner margin between the hook-shaped portion 44 and the outer margin 52 of the portion 50.

By deforming the portion of the disc adjacent the incision 42 on the side opposite the hook-shaped portions 44, the margins of the disc underlying the hook-shaped portions are shrunk to permit the insertion of the hook-shaped portions 44 into the apertures 28 of the blades 10 and then, upon straightening the deformed portions, the margins 52 of the disc underlying the hook-shaped portions 44 are extended into contact with the inner margins of the blades 10.

It will occur to those skilled in the art that numerous variations may be made in the design of this center support structure without departing from the scope and spirit of the present invention. As one example, it is an obvious expedient to engage only a portion of the blades 10 with the center support where the structural requirements for the blower wheel admit of such construction. As another example, it is apparent that other interlock portions functionally equivalent to the disclosed hook 26 and aperture 28 may be employed to interlock the center support with the blower wheel.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of securing a center support within a blower wheel which comprises a hollow cylindrical blade section having spaced parallel axially disposed blades, said center support comprising a hub, and first and second means radiating therefrom for engaging blades of the blower wheel, said method comprising the steps of forming a plurality of interlock portions on the first means thereof for engaging some at least of the blades, positioning the center support concentrically within the blower wheel so that the interlock portions are positioned in readiness for engaging the blades, moving the interlock portions of said first means in a direction normal to the blades and into the interengagement with the blades, forming marginal portions on said second means in substantial contact with the innermost margins of some at least of said blades, and deforming one of said first and second means after assembly of said center support in said blower wheel to establish a misfit between this one means and the blades engaged thereby and to stress the blades into pressured contact with the other of said means.

2. The method of securing a center support within a blower wheel which comprises a hollow cylindrical blade section having spaced parallel axially disposed blades, said center support comprising a hub, and first and second means radiating therefrom for engaging blades of the blower wheel, said method comprising the steps of forming a plurality of interlock portions on the first means thereof, providing complementary interlock portions in some at least of the blades, positioning said center support concentrically within said blower wheel so that the interlock portions are positioned in readiness for engagement with the blades, moving the interlock portions of said first means in a direction normal to the blades and into interengagement with the complementary interlock portions of said blades, forming marginal portions on said second means in substantial contact with the innermost margins of those blades interlocked with said first means, and deforming one of said means after assembly of said center support in said blower wheel to establish a misfit between this one means and the blades engaged thereby, said one means being deformed so as to stress the blades radially against the other means, said blades being clamped between the interlock portions of one means and the marginal portions of the other means.

3. The method according to claim 2 wherein the interlock portions on the first means comprise hooks projecting outwardly therefrom and wherein the interlock portions in said blades comprise apertures for receiving said hooks, the hooks being moved into said apertures by a rotary motion of said center support within said blower wheel.

4. The method of securing a center support within a blower wheel which comprises a hollow cylindrical blade section having spaced parallel axially disposed blades, said center support comprising a hub and first and second means radiating therefrom for engaging blades of the blower wheel, said method comprising the steps of forming a plurality of interlock portions on the first means of said center support, forming complementary interlock portions in some at least of the blades, forming marginal portions on said second means for contact with the innermost margins of said blades, deforming said second means to reduce the radial extension of said marginal portions, positioning the center support concentrically within the blower wheel, moving the interlock portions of said first means into interengagement with the complementary interlock portions in said blades, reforming said second means to place said marginal portions at their original radial extension, said reforming operation establishing a misfit between said second means and the blades engaged thereby so as to stress said blades and take up looseness between said interlock portions.

5. The method of securing a center support within a blower wheel which comprises a hollow cylindrical blade section having spaced parallel axially disposed blades, said center support comprising a hub, and first and second discs mounted thereon for engaging the blades of the blower wheel, said method comprising the steps of forming a plurality of interlock portions on the first disc, forming complementary interlock portions in some at least of the blades, forming a generally circular periphery on said second disc for engagement with the innermost margins of said blades, forming an annular protuberance in said second disc so as to reduce the diameter thereof, positioning said center support concentrically within said blower wheel, moving the interlocking portions of said first disc into interengagement with the complementary interlock portions of said blades, and pressing out the protuberance in said second disc to increase the diameter thereof thereby stressing said blades and taking up looseness between said interlock portions.

6. The method according to claim 5 wherein the interlock portions on said first disc comprise hooks projecting outwardly therefrom and wherein the interlock portions in said blades comprise apertures for receiving said hooks, said hooks being moved into said apertures by a rotary motion of said center support within said blower wheel.

7. The method of securing a center support within a blower wheel having a hollow cylindrical blade section having spaced peripheral axially disposed blades, said center support comprising a disc, said method comprising the steps of forming a plurality of hooks in the periphery of said disc, forming complementary interlock portions in at least some of the blades, forming radially disposed incisions extending inwardly in the disc from the vicinity of the hook-like extensions, deforming a portion of the adjacent periphery of the disc, said portion being located on the side of the incision and underlying the hook-like extensions, inserting the hooks through the interlock portions of the blades, straightening the deformed portions so as to force the outer margins of said deformed portions radially outwardly into engagement with the inner margins of the blades to lock the blades in position.

References Cited in the file of this patent

UNITED STATES PATENTS

| | | |
|---|---|---|
| 1,876,518 | Mathis | Sept. 6, 1932 |
| 2,240,238 | Baker | Apr. 29, 1941 |
| 2,392,113 | Anderson | Jan. 1, 1946 |
| 2,626,741 | Osborne | Jan. 27, 1953 |
| 2,684,521 | Morrison | July 27, 1954 |
| 2,852,182 | Wilken | Sept. 16, 1958 |
| 2,928,587 | Austin et al. | Mar. 15, 1960 |
| 2,929,549 | Hathaway et al. | Mar. 22, 1960 |